(12) United States Patent
Narasimhan et al.

(10) Patent No.: US 8,503,541 B2
(45) Date of Patent: Aug. 6, 2013

(54) METHOD AND APPARATUS FOR DETERMINING TIMING INFORMATION FROM A BIT STREAM

(75) Inventors: Mandayam A. Narasimhan, San Diego, CA (US); Robert O. Eifrig, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 1906 days.

(21) Appl. No.: 11/037,446

(22) Filed: Jan. 18, 2005

(65) Prior Publication Data

US 2005/0180512 A1 Aug. 18, 2005

Related U.S. Application Data

(60) Provisional application No. 60/537,075, filed on Jan. 16, 2004.

(51) Int. Cl.
*H04N 7/12* (2006.01)

(52) U.S. Cl.
USPC ............ 375/240.28; 375/240.12; 375/240.01

(58) Field of Classification Search
USPC ........................ 375/240.12, 240.28, 240.01
See application file for complete search history.

(56) References Cited

U.S. PATENT DOCUMENTS

| | | | |
|---|---|---|---|
| 6,873,740 B1 * | 3/2005 | Devillers et al. | 382/243 |
| 7,170,934 B2 | 1/2007 | Linzer | |
| 7,339,991 B2 * | 3/2008 | Haskell et al. | 375/240.16 |
| 7,386,049 B2 * | 6/2008 | Garrido et al. | 375/240.15 |
| 7,831,990 B2 * | 11/2010 | Visharam et al. | 725/95 |
| 2004/0114908 A1* | 6/2004 | Ito | 386/95 |
| 2004/0179619 A1* | 9/2004 | Tian et al. | 375/240.26 |

OTHER PUBLICATIONS

Wiegand T: "Draft ITU-T Recommendation and Final Draft International Standard of Joint Video Specification (ITU-T Rec. H.264/ISO/IEC 14496-10 AVC)" Apr. 2, 2003. ISO/IEC JTC1/SC20/WG11 JVT-G50, Pattaya, XP002328607. p. 203-205 p. 1-7.
PCT International Preliminary Report and Written Opinion. International Bureau of WIPO. Issued Jul. 17, 2006.
Office Action, U.S. Appl. No. 11/037,439, May 12, 2011.
Office Action, U.S. Appl. No. 11/037,439, Nov. 22, 2010.
Office Action, U.S. Appl. No. 11/037,439, Mar. 19, 2010.
Office Action, U.S. Appl. No. 11/037,439, Apr. 30, 2009.
Office Action, EPC App. No. 05705772.1, Nov. 18, 2010.
ISO/IEC 13818-1:2000 (ITU-T Recommendation H.222.0), "Information technology—Generic coding of moving pictures and associated audio information: Systems", 2nd ed., Dec. 2000.
ISO/IEC 13818-1/2000/Final Proposed Draft Amendment 3 (FPDAM-3), "Amendment 3: Transport of AVC video data over ITU-T Rec H.222.0 | ISO/IEC 13818-1 streams", ISO/IEC JTC1/SC29/WG11 N5467, Feb. 2003.

(Continued)

*Primary Examiner* — Sath V Perungavoor
*Assistant Examiner* — Geepy Pe

(57) ABSTRACT

A method and apparatus for determining timing information from an MPEG-2 stream carrying Advanced Video Coding (AVC) content is disclosed. The method includes receiving an initial access unit from the MPEG-2 stream, and determining whether the MPEG-2 stream contains a temporal picture order count (POC) parameter. If the temporal POC parameter is contained in the MPEG-2 stream, the temporal POC parameter is used to compute a presentation time stamp (pts) for a next presentation unit (m).

20 Claims, 5 Drawing Sheets

OTHER PUBLICATIONS

T. Wiegand, "Study of Final Committee Draft of Joint Video Specification (ITU-T Rec. H.264 | ISO/IEC 14496-10 AVC)", Joint Video Team (JVT) of ISO/IEC MPEG & ITU-T VCEG (ISO/IEC JTC1/SC29/WG11 and ITU-T SG16 Q.6), Document JVT-F100, produced Feb. 16, 2003.

S. Narasimhan, et al., "Comments and clarifications to JVT text JVT-F100", Joint Video Team (JVT) of ISO/IEC MPEG & ITU-T VCEG, Document JVT-G039, Mar. 2003.

J. Van Der Meer, et al., "RTP Payload Format for Transport of MPEG-4 Elementary Streams", IETF RFC 3640, Nov. 2003.

Amendment 3 to ITU-T Recommendation H.222.0 (2000), "Amendment 3: Transport of AVC video data over ITU-T Rec H.222.0 | ISO/IEC 13818-1 streams", ISO/IEC 13818-1:2000/Amd.3, Mar. 2004.

Y. Ogura, "Notice of Publication: ISO/IEC 13818-1:2000/Amd. 3:2004", ISO/IEC JTC 1/SC 29 N6390, Nov. 2004.

PCT Search Report, PCT/US2005/001472, Jul. 1, 2005.

PCT International Preliminary Report and Written Opinion, PCT/US2005/001472, Jul. 17, 2006.

PCT Search Report, PCT/US2005/001343, Jul. 5, 2005.

PCT International Preliminary Report and Written Opinion, PCT/US2005/001343, International Bureau of WIPO, Jul. 17, 2006.

A. Basso, et al., "Transmission of MPEG-2 Streams over non-guaranteed quality of service networks", Proc. of Picture Coding Symposium (PCS-97), Berlin, Germany, Sep. 1997.

* cited by examiner

METHOD AND APPARATUS FOR DETERMINING TIMING INFORMATION FROM A BIT STREAM

This application claims the benefit of U.S. Provisional Application No. 60/537,075 filed on Jan. 16, 2004, which is herein incorporated by reference.

BACKGROUND OF THE INVENTION

1. Field of the Invention

Embodiments of the present invention generally relate to an image processing system. More specifically, the present invention relates to a method and apparatus for determining timing information from a stream carrying Advanced Video Coding (AVC) content.

2. Description of the Related Art

Demands for lower bit-rates and higher video quality requires efficient use of bandwidth. To achieve these goals, the Moving Picture Experts Group (MPEG) created the Moving Picture Experts Group (MPEG) created the ISO/IEC international Standards 11172 (1991) (generally referred to as MPEG-1 format) and 13818 (1995) (generally referred to as MPEG-2 format), which are incorporated herein in their entirety by reference. One goal of these standards is to establish a standard coding/decoding strategy with sufficient flexibility to accommodate a plurality of different applications and services such as desktop video publishing, video telephone, video conferencing, digital storage media and television broadcast.

The MPEG standards have been very effective and have gained wide acceptance in many different implementations. Nevertheless a new coding standard has recently been adopted, i.e., ISO/IEC 14496-10 or ITU-T Recommendation H.264 for the Advanced Video Coding (AVC). Similar to MPEG, AVC provides tremendous flexibility in various functions that can be implemented in an image processing system. The transport of the AVC content is an area that can be implemented using different schemes. However, the proper transport of the encoded content is an important aspect that affects the efficiency and performance of an encoding/decoding system. Additionally, it is important to determine output timing conformance.

Thus, there is a need in the art for a method and apparatus for determining timing information from a stream carrying Advanced Video Coding (AVC) content.

SUMMARY OF THE INVENTION

In one embodiment, the present invention discloses a novel method and apparatus for determining timing information from a stream carrying Advanced Video Coding (AVC) content. For example, a method and apparatus for determining timing information from an MPEG-2 stream carrying AVC content is disclosed. In one embodiment, presentation time stamps and decoding time stamps are computed from the stream carrying the AVC content.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

In one embodiment, the present invention discloses a novel method and apparatus for determining timing information from a stream carrying Advanced Video Coding (AVC) content. For example, a method and apparatus for determining timing information from an MPEG-2 stream (e.g., a transport stream or a program stream) carrying Advanced Video Coding (AVC) content is disclosed.

Carriage of AVC content in MPEG-2 systems allows the majority of the tools used for demultiplexing, synchronization and buffer management to be re-used by currently deployed decoders. As such, there is a practical advantage in using MPEG-2 systems to carry the AVC content. However, there are significant differences between the two standards. Thus, it is important to ensure output timing conformance in all compliant decoders. To address this criticality, in one embodiment, the present invention discloses a method for determining output timing information (e.g., presentation time stamps (PTSS) and decoding time stamps (DTSs)) from an MPEG-2 stream that is carrying Advanced Video Coding (AVC) content.

It should be noted that although the present invention is described within the context of MPEG-2 systems, the present invention is not so limited. Namely, the present approach can be adapted to other similar transport systems compliant to any other compression standards, e.g., MPEG-4, H.261, H.263 and so on. In other words, the present invention can be applied to any other compression standards that allow a flexible transport implementation.

Figure 1:
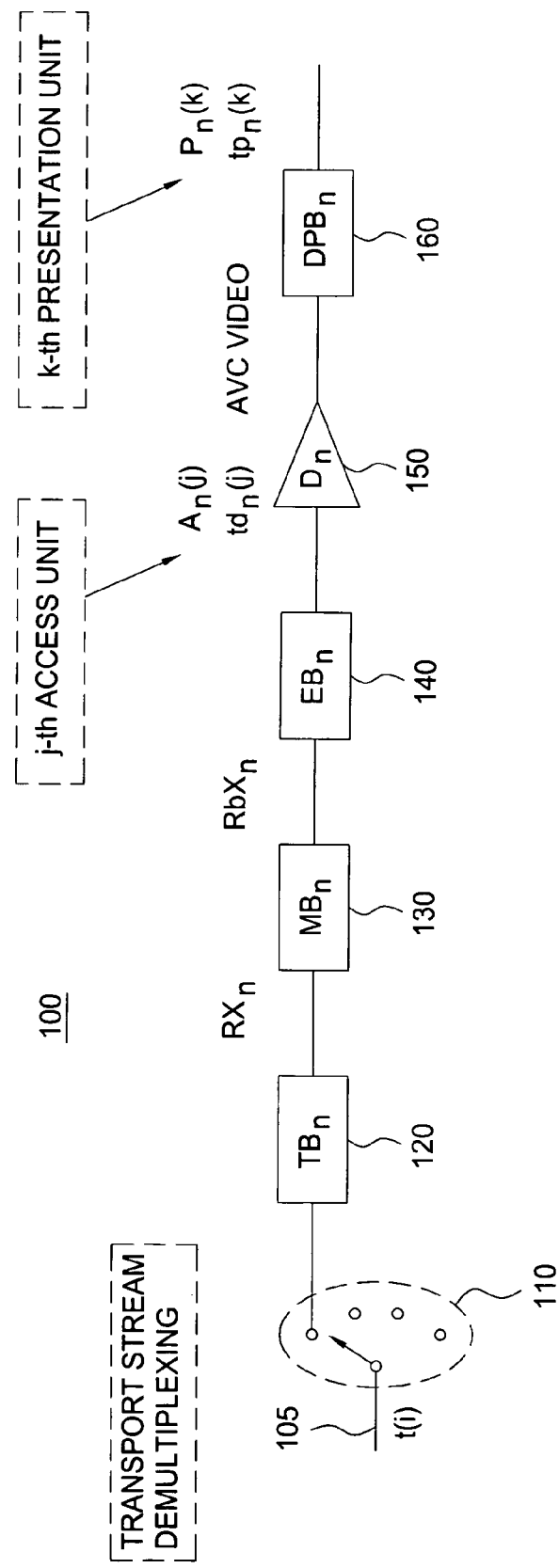
FIG. 1 illustrates a Transport-System Target Decoder (T-STD) model of the present invention.

FIG. 1 illustrates a Transport-System Target Decoder (T-STD) 100 model of the present invention. The T-STD model comprises a demultiplexer 110, a transport buffer $TB_n$ 120, a multiplex buffer $MB_n$, 130, an elementary stream decoder buffer $EB_n$ 140, a delay $D_n$ 150, and a decoded picture buffer $DPB_n$, 160. The three buffers $TB_n$ 120, $MB_n$ 130, and $EB_n$ 140 are used to decode each AVC video elementary stream n.

To illustrate, the Transport-System Target Decoder 100 is defined to enable multiplexers to create data streams that are decodable by all receivers. In one embodiment, the transport buffer $TB_n$ 120 inputs data at the full rate of the transport stream 105, but outputs data (if present) at a rate $Rx_n$ that may depend on the data type and specification. The multiplex buffer $MB_n$ 130 is used for video and is intended to alleviate the effect of transport stream packet multiplexing. In one embodiment, the output rate of the multiplex buffer $MB_n$ 130 can be specified in one of two ways. First, with the "Leak Method", the $MB_n$ outputs data (if present and if $EB_n$ is not full) at a rate $Rbx_n$ that depends on the data type and specification. With the "VBV_delay Method", the output rate is piecewise constant for each picture and is specified by the encoder using parameters in the video stream. Finally, the elementary stream decoder buffer $EB_n$ 140 whose size is generally fixed for audio and systems and is specified in the video stream for video.

In one embodiment, use of the STD defined Leak Method for management of data between $MB_n$ and $EB_n$ as a default can be implemented. This approach is exactly the same as defined for MPEG-2 video management. In addition, the present invention will specify the Hypothetical Reference Decoder (HRD) based Leak Method and this will be signaled using a new descriptor (HRD-STD descriptor) as disclosed below. To illustrate, this descriptor will be very similar to the STD descriptor and will use an hrd-leak-valid flag within the descriptor. If the HRD-STD descriptor is present in the Program Map Table (PMT) or Program Stream Map (PSM) and the hrd-leak-valid flag is set to "1", then the STD management will use the HRD defined Leak Method. This method is slightly different from the standard Leak Method and may require extensions.

In one embodiment, the present invention is related to the carriage of AVC streams in a uniform fashion over MPEG-2 systems (e.g., both transport and program streams). AVC coding mandates only the VCL (video coding layer) elements and all other elements such as parameter sets, timing data and display parameters are optional in the in-band AVC stream. As all of these elements are required by MPEG-2 systems and for timing conformance verification of AVC streams, it is necessary to define and employ MPEG-2 system specific tools and/or constraints to generate the optional elements that are not present in the in-band AVC stream. Since the present invention addresses AVC content that is transported using the MPEG-2 systems, a novel method, protocol and apparatus for transporting Advanced Video Coding (AVC) content is disclosed in US patent application with and with US patent application serial number 11/037,439, which is simultaneously filed with the present application on Jan. 18, 2005 and is herein incorporated in its entirety by reference.

When AVC video is carried using the MPEG-2 systems, the resulting bitstream is a Type II bitstream and output timing conformance is required of all decoders. It should be noted that under AVC, coded video data is organized into Network Abstraction Layer (NAL) units, each of which can be a packet containing an integer number of bytes. However, there are two classes of NAL units, called VCL (Video Coding Layer) and non-VCL NAL units. VCL NAL units contain the data that represents the values of the samples in the video pictures, whereas non-VCL NAL units contain all other related information such as parameters sets and supplemental enhancement information (SEI). Thus, some information contained in the non-VCL NAL units is required to be present in all bitstreams, such as the access unit delimiter, sequence parameter set (SPS) and picture parameter set (PPS). Other information in the non-VCL NAL units (particularly some of the parts to the video usability information (VUI), the buffering period SEI message and certain parts of the picture timing SEI message) required by the HRD model may not be present in the AVC elementary stream. In this case, "out-of-band" communication between the systems layer decoder and the timing conformant video elementary stream decoder provides the required information as described below. If duplicate information exists between the systems layer and video layer, it shall be consistent, defined as follows:

a) Any two conforming decoders utilizing any subset of the available information provided by the video and systems layers shall produce identical sequences.

b) Picture content, Coded Picture Buffer (CPB) and DPB content and picture output timing shall be the same at all times.

For every access unit n, let pts(n) be the mathematically exact presentation (output) time in seconds (maintained without accumulated error) and let dts(n) be the mathematically exact instantaneous decoding time in seconds (maintained without accumulated error). The procedure for iteratively calculating pts(n) and dts(n) for each access unit is defined below. It should be noted that $pts(n)=t_{o,dpb}(n)$ and $dts(n)=t_r(n)$ as defined in the AVC annex C. The terms PTS(n) and DTS(n) refer to the coded syntax elements in the PES packets (when available) and are units of the 90 KHz system clock for the current program. The time scale equal to zero point in real arithmetic (for PTS(n) and DTS(n)) shall be within (1/90000) of a second of the point where PTS(n) and DTS(n) are zero.

The correspondence between the HRD in video and the T-STD or Program-System Target Decoder (P-STD) in systems is defined as follows. The elementary stream buffer $EB_n$ in the T-STD and $B_n$ in the P-STD defined in ISO/IEC 13818-1 are exactly the same as coded picture buffer (CPB) in the HRD described in AVC. The timing equivalence between the T-STD/P-STD and HRD is given by:

1. Input time equivalence: The Hypothetical Stream Scheduler (HSS) delivery time of each elementary stream bit is the same as the input timing of the $EB_n$ or $B_n$, elementary stream data.
2. Decoding time equivalence: When DTS(n) is present, $DTS(n)<=90000.0*t_r(n)<DTS(n)+1$
3. Output (presentation) time equivalence: When PTS(n) is present, $PTS(n)<=90000.0*t_{o,dpb}(n)<PTS(n)+1$ At any point in time, the contents of the $EB_n$ in the T-STD or $B_n$ in P-STD and the CPB in the HRD shall be identical.

When the HRD is not controlled by syntax in the AVC elementary stream, the input timing is obtained from the T-STD or P-STD as specified in ISO/IEC 13818-1 shall be used by the HSS. This means that the arrival time according to the current program's system clock of each input bit can be obtained by linearly interpolating between consecutive Program Clock Reference (PCR) packets (for T-STD) or consecutive System Clock Reference (SCR) pack headers (for P-STD). Several requirements are further disclosed below.

Requirement 1: Instantaneous Decoding Refresh (IDR) pictures or pictures following (in decoding order) a picture containing a memory management control operation 5 shall contain an explicit PTS and DTS.

Requirement 2: PTS and DTS shall be present on the access unit designated as an access point, entry point or random access point. Entry point and random access point access units must contain the active SPS and PPS. These access units shall be coded in a manner that permits the AVC decoding process to begin at this point. Note that it is sufficient (but not necessary) for these access units to be IDR pictures. When initiating the decoding process at access unit n, the initial values of pts(n) and dts(n) are set by:

$$pts(n)=PTS(n)\div 90000.0$$

$$dts(n)=DTS(n)\div 90000.0$$

It should be noted that it is necessary to have the interpolated PCR, PTS & DTS for the first access unit before the decoding process can begin.

For all later access units, pts(n) and dts(n) must be unambiguously determined. The following sections describe how pts(n) and dts(n) are determined for the various legal syntax combinations. For all PTS(n) and DTS(n) timestamps on access units after the start of the decoding process shall satisfy the following constraints (ignoring wrap around):

$PTS(n) <= 90000.0*pts(n) < PTS(n)+1$ $DTS(n) <= 90000.0*dts(n) < DTS(n)+1.$

When an AVC bitstream is carried in an ISO/IEC 13818-1 systems layer and explicit HRD management parameters are not present in the elementary stream, Type II bitstream conformance shall be required and shall be tested by simulating the HRD assuming the arrival times of each bit, $t_r(n)$ and $t_{o,dpb}(n)$ are communicated to the HRD buffer model specified in AVC by out-of-band means. The CPB size shall be the maximum allowed size according to the bitstream level_idc. The DPB size (if not restricted by max_dec_frame_buffering) shall be the maximum allowed size according to level_idc.

There are various constraints on the presence of PTS and DTS. PTS and DTS shall be included in the bitstream at least once every 0.7 seconds. If an access unit contains a PTS with no corresponding DTS, the DTS for that access unit shall be inferred to be equal to PTS and is considered to be a coded DTS.

If the AVC elementary stream contains NAL HRD parameters and the $EB_n/B_n$ buffers of the STD are to be managed according to the procedure specified in AVC, then the use of HRD shall be signaled by the presence of the AVC timing and HRD descriptor with hrd_management_valid equal to 1. Access units containing PTS and DTS shall have decode time equivalence and output time equivalence based on input rate and buffer size given in the NAL HRD parameters in the VUI syntax for SchedSelIdx equal to 0. VCL HRD parameters cannot be used for the Type II bitstream conformance verification required when encapsulated in an ISO/IEO 13818-1 systems layer.

For non-constant output frame rates the following will apply. The output frame rate is considered to be non-constant if there is no fixed_frame_rate_flag equal to 1 in either the AVC timing and HRD descriptor or VUI picture timing syntax. When non-constant output frame rate exists, the decoding time and presentation time shall be explicitly signaled on each access unit. This shall be done by:
  a) Providing PTS and DTS for each access unit.
  or
  b) Coding the NAL HRD parameters to specify the decoding and output timing of each access unit.

If the output frame rate is constant, it is specified with fixed_frame_rate_flag equal to 1 in either the AVC timing and HRD descriptor or VUI syntax. In this case, half of the frame period ($\Delta t_{fi,dpb}$) in seconds is given by (num_units_in_tick÷time_scale). The video output consists of a continuous sequence of frames and/or fields of alternating parity. When the output frame rate is constant, a normative output process for replicating decoded frames and/or fields is specified.

If PTS and DTS are not present in each access unit and HRD parameters are not in use, then one of the following cases must apply:
  1. The VUI pic_struct_present_flag is equal to 1 indicating that the picture timing SEI message may be present for some access units. If pic_struct is not available for a particular access unit then a pic_struct value of 0, 1 or 2 (communicated by out-of-band means from the video decoder to the system decoder) for decoded frames, decoded fields with bottom_field_flag equal to 0 or decoded fields with bottom_field_flag equal to 1 respectively. If frame_mbs_only is 0, alternating output field parity shall occur as specified by the POC order of the fields.
  2. The AVC timing and HRD descriptor is present and contains temporal_poc_flag equal to 1 then the following applies. If frame_mbs_only is equal to 1, picture order counts (POCs) shall be frame numbers in output order and a gap in the POC sequence indicates repeating the earlier frame for the indicated duration. If frame_mbs_only is equal to 0, then the POCs shall be field numbers. A missing field number in the field number sequence indicates a repetition of the previous field of the same parity.
  3. If neither of the above cases apply, then every access unit is inferred to have a pic_struct value of 0, 1 or 2 (communicated by out-of-band means from the video decoder to the system decoder) for decoded frames, decoded fields with bottom_field_flag equal to 0 or decoded fields with bottom_field_flag equal to 1 respectively. If frame_mbs_only is 0, alternating output field parity shall occur.

The determination of the missing pts(m) and dts(n+1) values for each access unit in the constant output rate scenario is specified below. The iterative procedure for defining pts(m) proceeds in output order and relies on the POC numbers, pic_struct and simulating the contents of the DPB. The method for calculating dts(n+1) advances in decoding order and may require knowledge of the pts(m) sequence In one embodiment, iterative determination of pts(m) for constant output rate is disclosed. The initial access unit decoded is required to have an explicit PTS, so the initial output time from the DPB is known. For each access unit that does not have a explicit PTS, the following procedure is used to select the next picture to output, m, and specify time at which it is output, pts(m):
  1. Let n be the index in decoding order of the most recent picture output and pts(n) is known. The output duration (e.g. how long a picture is to remain on a screen), d(n), of the current picture n is specified by pic_struct and the constant output rate. If no pic_struct is present, then coded frames have a duration of one frame period and coded fields have duration of one half frame period. Note that $d(n)=\Delta t_{o,dpb}(n)$ in the AVC standard.
  2. At pts(n)+d(n) and the picture with the smallest POC is selected among (a) the pictures in the DPB marked as "needed for output" and (b) the next picture to be decoded. This will be the next picture to output. Let m be the index of this picture in decoding order.
  3. If temporal_poc_flag is equal to 1 and frame_mbs_only_flag is equal to 0, define:

$R_{fid}=POC(\text{firstField}(m))-POC(\text{firstField}(n))-d(n)$
$\div \Delta t_{fi,dpb}),$ $R_{fid}$ is the number of field repeats between presentation unit n and presentation unit m, and $\Delta t_{fi,dpb}$ is the field period. It is illegal for $R_{fid}$ to be negative. The repeated fields are copies of the most recent field output of opposite parity to the last field output. In this case:

$pts(m)=pts(n)+(POC(\text{firstField}(m))-POC(\text{firstField}(n)))*\Delta t_{fi,dpb}$ 4. If temporal_poc_flag is equal to 1 and frame_mbs_only_flag is equal to 1, define:

$R_{frm}=POC(m)-POC(n)-(d(n) \div (2*\Delta t_{fi,dpb})).$ $R_{frm}$ is the number of frame repeats between presentation unit n and presentation unit m. It is illegal for $R_{frm}$ to be negative. The repeated frames are copies of the most recent frame output (presentation unit n). In this case:

$$pts(m)=pts(n)+(POC(m)-POC(n))*(2*\Delta t_{fi,dpb}).$$

5. If temporal_poc_flag is 0 or not present, pts(m)=pts(n)+ d(n)
6. If step 2 above selected the next picture m to be decoded (not a picture already stored in the DPB) and picture m is a reference picture, then an available entry in the DPB shall be available at pts(m).
7. If an IDR picture or MMCO command equal to 5 cause the POC counters to be reset, a new POC epoch begins. All pictures in the DPB that were decoded before the start of the new epoch (picture with picture order count equal to 0) must be output before any pictures of new epoch.

If an IDR picture started the new epoch, all pictures from the old epoch are marked as not "used for reference". If the no_Output_of_prior_pics_flag is 1, then all pictures from the old epoch remaining in the DPB are freed (and not output) at the decoding time of the IDR picture.

Figure 2:
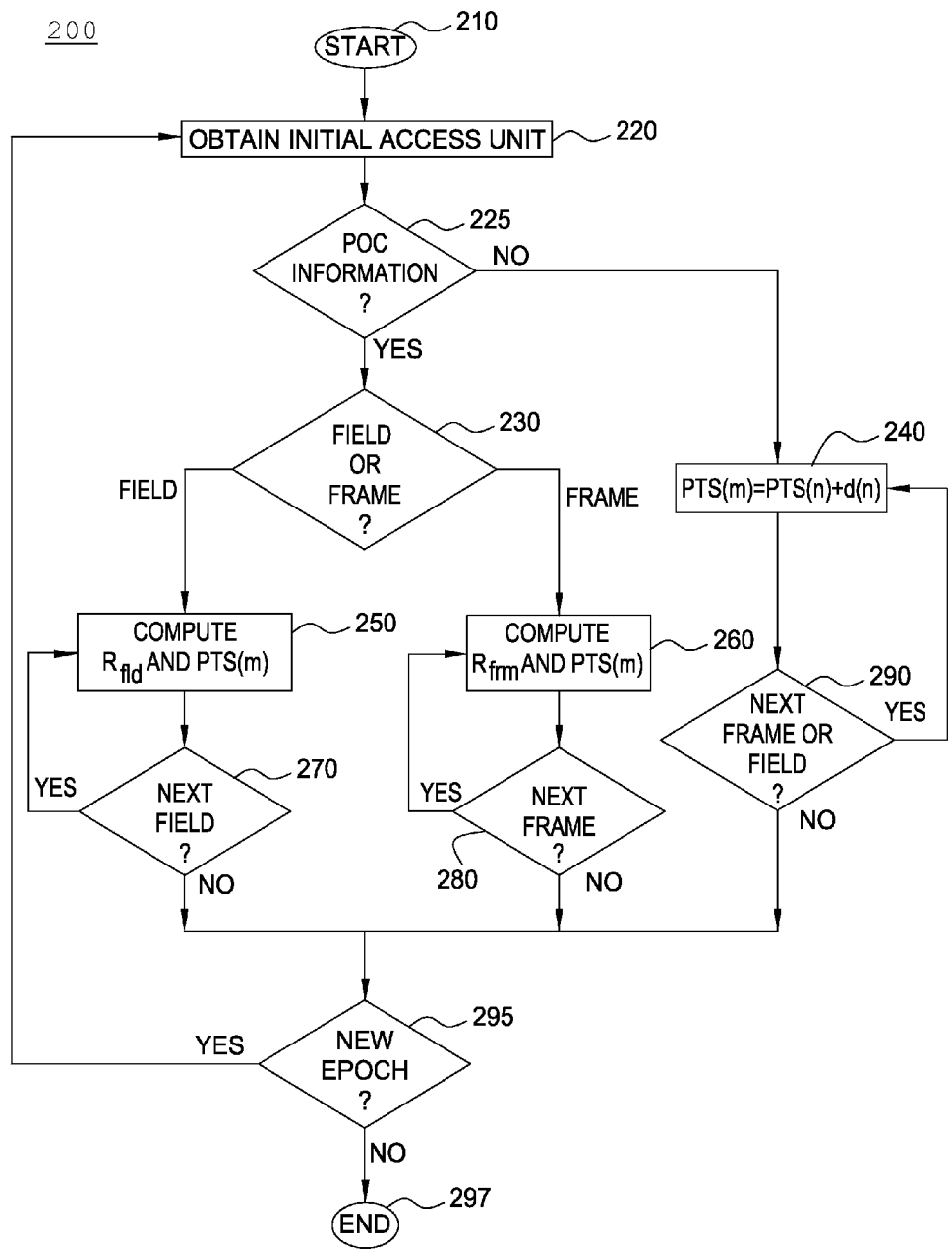
FIG. 2 illustrates a method for determining timing information, e.g., presentation time stamp for a picture, from a stream carrying AVC content in accordance with the present invention.

FIG. 2 illustrates a method 200 for determining timing information, e.g., presentation time stamp for a picture, from a stream carrying AVC content in accordance with the present invention. Specifically, FIG. 2 illustrates the iterative determination of pts(m) for constant output rate as discussed above in the form of a flowchart.

Method 200 starts in step 210 and proceeds to step 220. In step 220, method 200 obtains an initial access unit, e.g., the first access unit after a new POC epoch begins. Since the initial access unit is required to have an explicit pts(n), the initial output time from the DPB is known.

In step 225, method 200 determines whether temporal POC information is present. If the query is negatively answered, then method 200 proceeds to step 240, where the pts(m) for the next picture is derived from the pts(n) and the output duration, d(n). If the query is positively answered, then method 200 proceeds to step 230.

In step 230, method 200 determines whether the next picture is a field or a frame that will be presented. If the next picture is a field, method 200 proceeds to step 250, where pts(m) and $R_{fld}$, a number of field repeats between presentation unit n and presentation unit m are computed in accordance with step 3 as discussed above. If the next picture is a frame, method 200 proceeds to step 260, where pts(m) and $R_{frm}$, a number of frame repeats between presentation unit n and presentation unit m are computed in accordance with step 4 as discussed above.

In steps 270, 280, and 290, method 200 respectively, determines whether there will be a next field or frame that needs to be presented. If the query is positively answered, then method 200 returns to steps 250, 260, and 240, respectively. If the query is negatively answered, then method 200 proceeds to step 295.

In step 295, method 200 determines whether a new epoch has begun. If the query is positively answered, then method 200 returns to step 220 and obtain the initial access unit for the next new epoch. If the query is negatively answered, then method 200 ends in step 297.

In one embodiment, the iterative specification of dts(n+1) for constant output rate is disclosed. Because the initial access unit decoded is required to have an explicit DTS, the initial instantaneous decoding time is known. This instantaneous decoding time is equal to the time the access unit is removed from the CPB and either added to the DPB or immediately presented for output (PTS is equal to DTS in the latter case). For each access unit that does not contain a coded DTS, the following procedure is used determine the instantaneous decoding time:

1. Let n the be access unit index in decoding order of the most recently decoded picture. In this case dts(n) is known. Define $$mindts(n+1)=dts(n)+(2-\text{field\_pic\_flag}(n))*\Delta t_{fi,dpb}.$$

pts(n+1) shall not be smaller than dts(n+1) and dts(n+1) shall not be smaller than mindts(n+1). If there is space available in the DPB buffer (defined below), then dts (n+1)=mindts(n+1). Otherwise (there is no available space in the DPB at mindts(n+1)), dts(n+1) is the earliest time greater than mindts(n+1) that (a) a DPB frame becomes available or (b) access unit n+1 is a non-reference picture and the presentation time pts(n+1) for this picture occurs.

2. If access unit n+1 is the second coded field of a complementary field pair, then it is always stored in the same DPB frame buffer as the first coded field on the complementary field pair (access unit n). Space to store the second field of a complementary field pair is always available.

3. A DPB frame buffer is freed when it is both (a) not marked as "used for reference" and (b) not marked as "needed for output". The processes for un-marking a pictures "used for reference" and "needed for output" in the DPB proceed independently. A picture marked as "used for reference" is no longer "used for reference" when it is explicitly freed by the an MMCO operation specified by the dec_ref_pic_marking ( ) syntax (at the end of the decoding process for a picture containing this syntax) or the next picture to be decoded is an IDR picture or by the sliding window process (if the current picture contains a nal_ref_idc value not equal to 0). Pictures marked as "needed for output" become instantly not needed for output at the PTS time for that picture (defined above).

4. If access unit n+1 is a picture marked as "used for reference", the sliding window algorithm will un-mark an earlier picture(s) marked as "used for reference" if the DPB contains num_ref_frames frames, complementary field pairs or singleton fields. There will be at least one DPB buffer which does not contain a picture marked as "used for reference" when the decoding process for access unit n+1 is ready to proceed. If an empty DPB frame does not exist at mindts(n+1), the decoding process must wait for the output of a frame in the DPB that is not marked as "used for reference" (let this access unit be m in decoding order). In this case:

$$dts(n+1)=pts(m).$$

5. If the current picture is not marked as "used for reference" and all available frames in the DPB are in use, then decoding of this picture will be delayed until the earlier of following two events:
a) The presentation time of the current picture occurs. In this case $$dts(n+1))=pts(n+1).$$

At this point, access unit n+1 is instantaneously decoded and presented and the resulting output frame never resides in the DPB. This occurs when POC(n+1) is smaller than the POCs of all pictures marked as "needed for output" in the DPB.

b) The earliest time that a picture in a DPB frame buffer marked as "needed for output," but not marked as "used for reference," is output. If the index of this picture in decoding order is m, $$dts(n+1)=pts(m).$$

Figure 3:
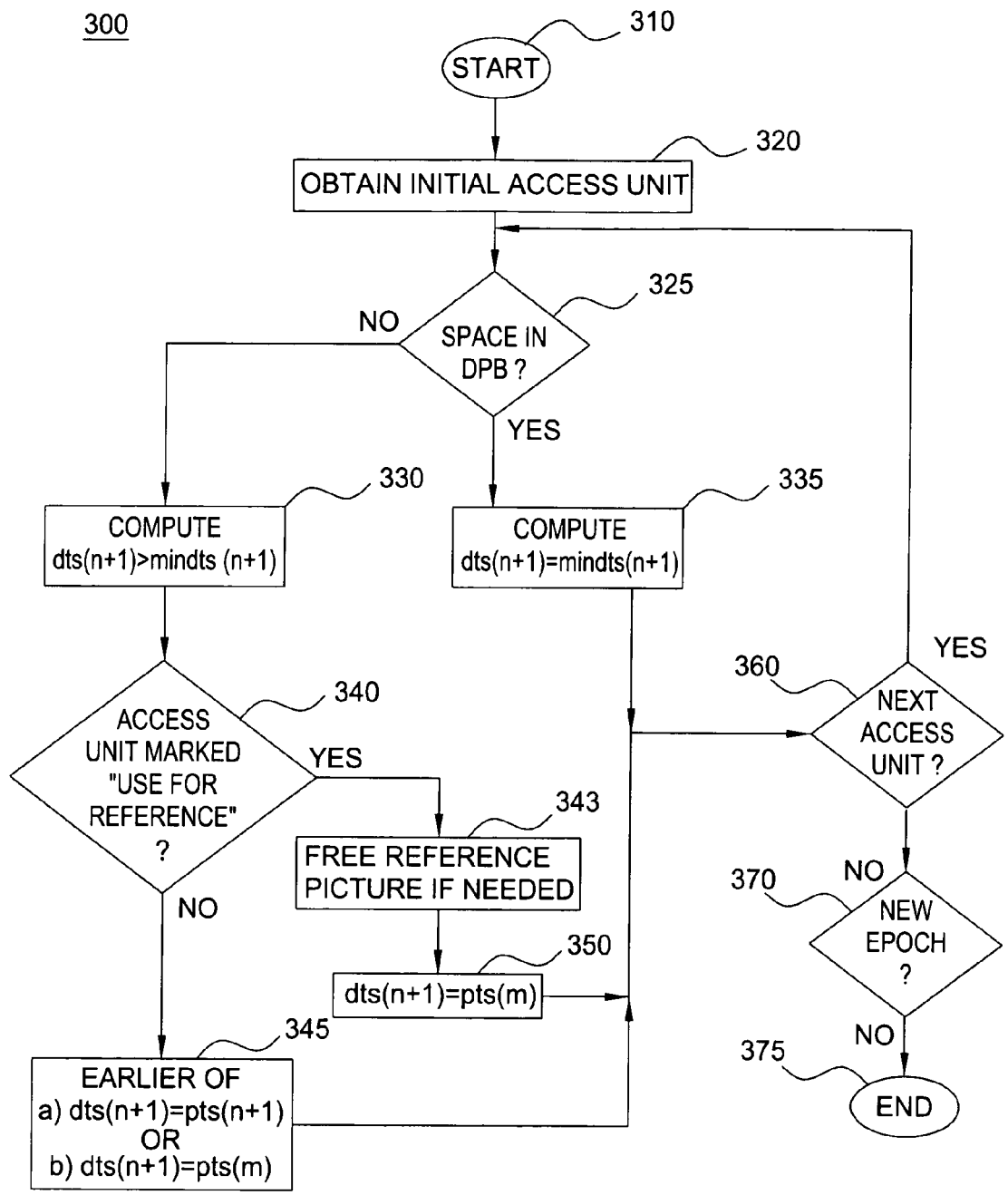
FIG. 3 illustrates a method for determining timing information, e.g., decoding time stamp for a picture, from a stream carrying AVC content in accordance with the present invention.

FIG. 3 illustrates a method 300 for determining timing information, e.g., decoding time stamp for a picture, from a stream carrying AVC content in accordance with the present invention. Specifically, FIG. 3 illustrates the iterative determination of dts(n+1) for constant output rate as discussed above in the form of a flowchart.

Method 300 starts in step 310 and proceeds to step 320. In step 320, method 300 obtains an initial access unit, e.g., the first access unit after a new POC epoch begins. Since the initial access unit is required to have an explicit dts(n), the initial decoder time stamp is known.

In step 325, method 300 determines whether the DPB has space. If the DPB has space, method 300 proceeds to step 335, where dts(n+1) is computed as equal to mindts (n+1) as discussed above in step 1. If the DPB does not have space, method 300 proceeds to step 330, where dts(n+1) is computed as greater than mindts (n+1) as discussed above in step 1. Exactly how much greater than mindts (n+1) is further described below.

In step 340, method 300 determines whether the current access unit is marked "use for reference". If the query is positively answered, then method 300 proceeds to step 343 where a reference picture is freed from the buffer if necessary. Method 300 then proceeds to step 350 where dts(n+1) is computed as equal to pts(m) as discussed above in step 4. If the query is negatively answered, then method 300 proceeds to step 345 where dts(n+1) is computed as either equal to pts (n+1) or pts(m) as discussed above in step 5.

In step 360, method 300 determines whether there will be a next access unit to be decoded. If the query is positively answered, then method 300 returns to step 325. If the query is negatively answered, then method 300 proceeds to step 370.

In step 370, method 300 determines whether a new epoch has begun. If the query is positively answered, then method 300 returns to step 320 and obtain the initial access unit for the next new epoch. If the query is negatively answered, then method 300 ends in step 375.

Figure 4:
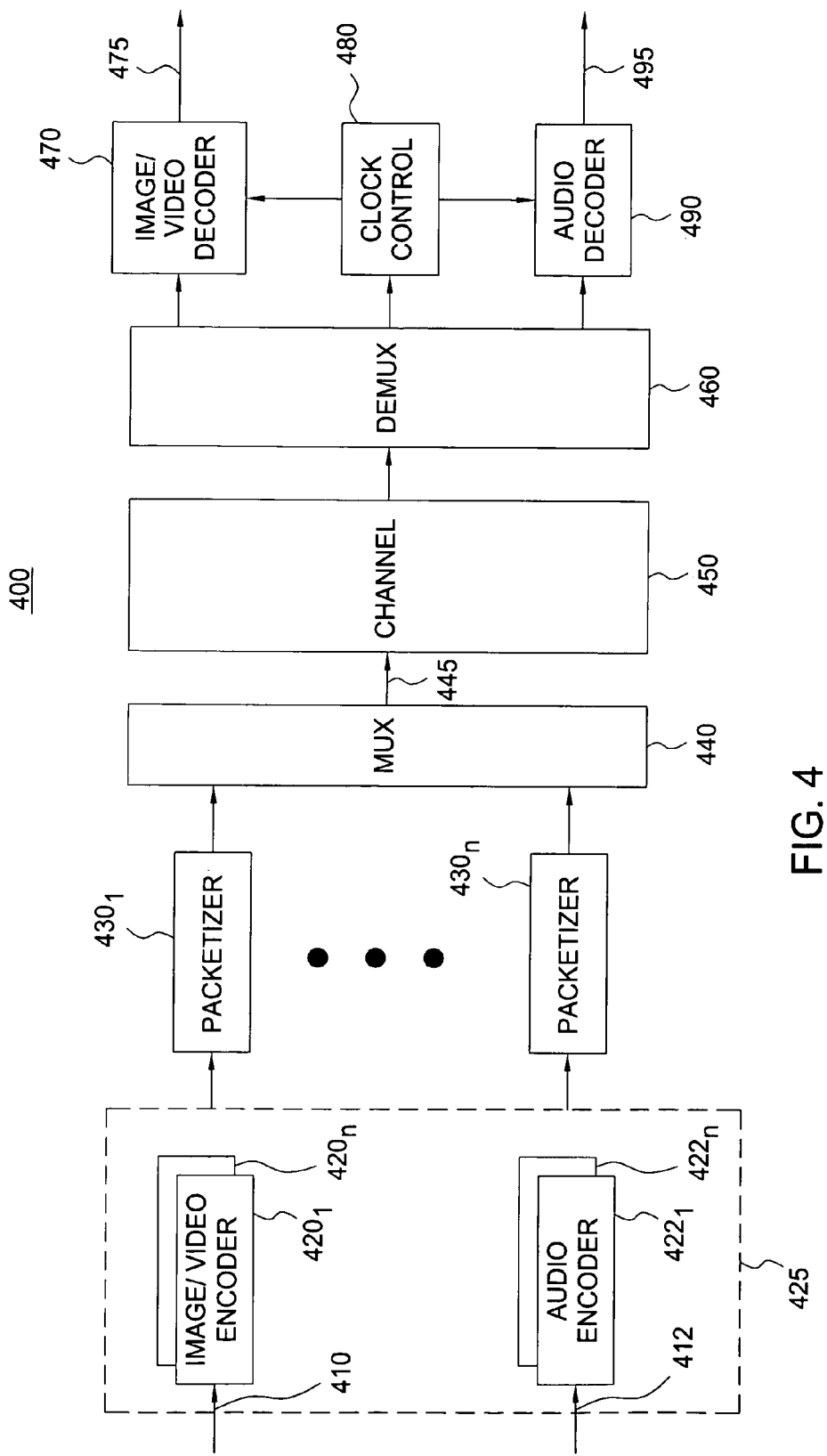
FIG. 4 illustrates a block diagram of a simplified packet stream system of the present invention.

FIG. 4 illustrates a block diagram of a simplified structure of a packet stream system 400 of the present invention. Specifically, the above disclosure pertaining to the method and apparatus for determining timing information from a stream carrying Advanced Video Coding (AVC) content can be illustrated in FIG. 4. For illustration, a data stream such as a "transport stream" as defined in accordance with the MPEG standards is used in the packet stream system illustrated in FIG. 4. Although the present invention is described below using the transport stream as an example, those skilled in the art will realize that the present invention can be applied to any packet streams, e.g., an MPEG "program stream" or any other packet streams in accordance with other formats. Furthermore, although the present invention is described below using the term "stream", it should be understood that the various operations described below may be performed on the entire stream or portion thereof.

System 400 includes an image/video encoder 420 for receiving and encoding video data 410 into an elementary video bitstream. In one embodiment, the video encoder 420 is an AVC compliant encoder. Throughout this disclosure the terms image sequence, images, and video are used interchangeably.

Similarly, the system may include an audio encoder 422 for receiving and encoding audio data 412 into an elementary audio bitstream. However, those skilled in the art will realize that a plurality of image/video encoders $420_n$ and audio encoders $422_n$ can be employed to produce a plurality of elementary bitstreams. In fact, the plurality of video and audio encoders can be collectively represented by a server 425, which may employ various encoders and/or may simply contain a plurality (or a library) of stored elementary streams in various storage media. Generally, the output of such server contains interleaved program streams.

In turn, these bitstreams are sent to packetizers 430 of the present invention, where the elementary bitstreams are converted into packets. Information for using the packets independently of the transport stream may be added when the packets are formed. Thus, non-audio/video data are allowed, but they are not shown in FIG. 4. It should be noted that although in a preferred embodiment, the present encoder and the packetizer are implemented in a single module, those skilled in the art will realize that the functions performed by the encoder and the packetizer can be jointly or separately implemented as required by a particular application.

The packets are received and multiplexed by the transport stream multiplexer 440 to produce a transport stream 445. Packets constructed from elementary streams that form a program (a group of "Packet Identifiers" (PIDs) with associated video and audio data) generally share a common time base. Thus, the transport stream may contain one or more programs with one or more independent time bases, where the time bases are used for synchronized presentation. The time bases of different programs within a transport stream may be different.

The transport stream 445 is transmitted over a transmission channel 450, which may further incorporate separate channel specific encoder and decoder (not shown). Next, the transport stream 445 is demultiplexed and decoded by a transport stream demultiplexor 460, where the elementary streams serve as inputs to video decoder 470 and audio decoder 490, whose outputs are decoded video signals 475 and audio signals 495, respectively.

Furthermore, timing information is also extracted by the transport stream demultiplexor 460 and delivered to clock control 480 for synchronizing the video and audio decoders with each other and with the channel. Synchronization of the decoders with the channel is accomplished through the use of the timing information in the transport stream.

Figure 5:
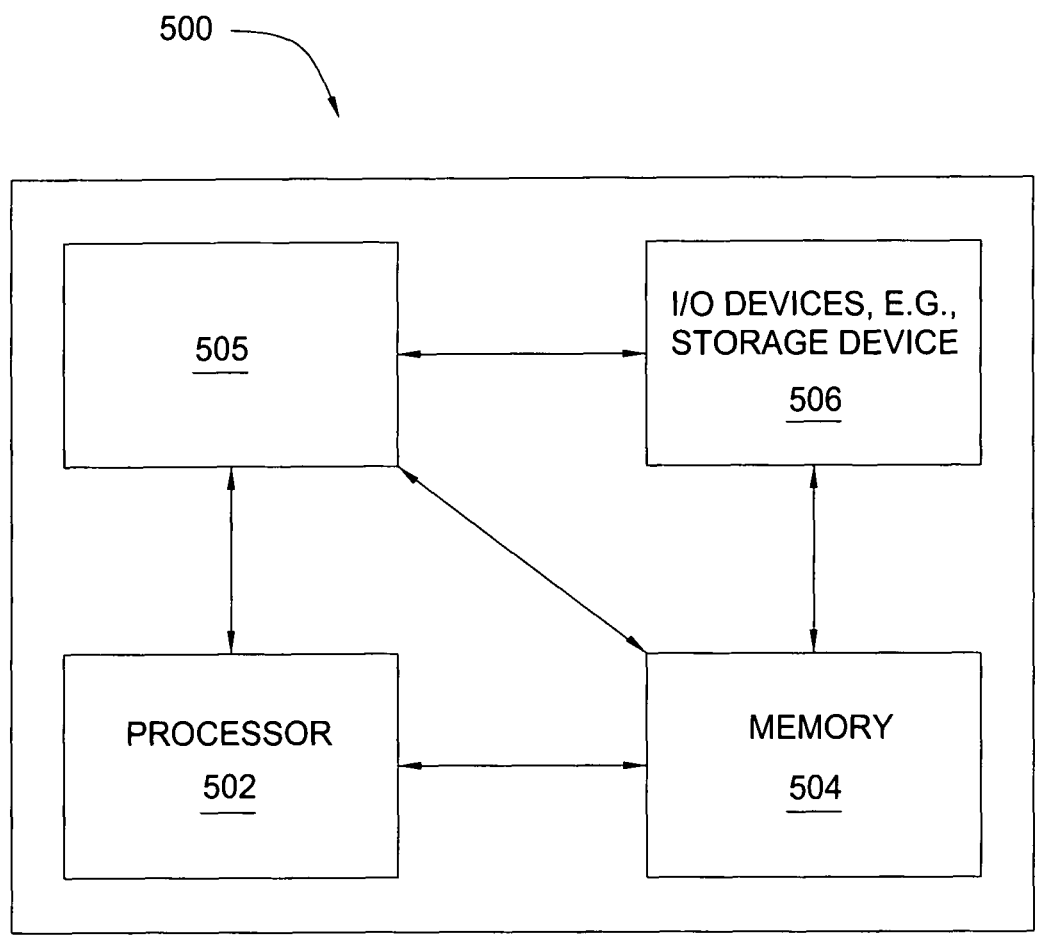
FIG. 5 illustrates the present invention implemented using a general purpose computer.

FIG. 5 is a block diagram of the present invention being implemented with a general purpose computer. In one embodiment, the encoding system or decoding system 500 is implemented using a general purpose computer or any other hardware equivalents. For example, the encoding system or decoding system 500 can be broadly implemented as the encoding system or decoding system of FIG. 4, or portions thereof, e.g., the video encoder 420, the audio decoder 422, the packetizer 430, the video decoder 470, the audio decoder 490 and so on. More specifically, the encoding system or decoding system 500 comprises a processor (CPU) 502, a memory 504, e.g., random access memory (RAM) and/or read only memory (ROM), one or more encoding or decoding components or elements 505 as described above, and various input/output devices 506 (e.g., storage devices, including but not limited to, a tape drive, a floppy drive, a hard disk drive or a compact disk drive, a receiver, a decoder, a decryptor, a transmitter, a clock, a speaker, a display, an output port, a user input device (such as a keyboard, a keypad, a mouse, and the like), or a microphone for capturing speech commands).

It should be understood that the one or more encoding or decoding components or elements 505 can be implemented as a physical device or subsystem that is coupled to the CPU 502 through a communication channel. Alternatively, the one or more encoding or decoding components or elements 505 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 504 of the computer. As such, the one or more encoding or decoding components or elements 505 (including associated data structures and methods) of the present invention can be stored on a computer readable medium or carrier, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for determining timing information from a Moving Pictures Experts Group-2 (MPEG-2) stream carrying Advanced Video Coding (AVC) content, comprising:
receiving an initial access unit and a next access unit from said MPEG-2 stream at a computing device, wherein said initial access unit includes a presentation time stamp and said next access unit does not include a presentation time stamp;
determining whether said MPEG-2 stream contains a picture order count (POC) parameter in the video and whether said MPEG-2 stream contains signaling in a Program Map Table (PMT) or a Program Stream Map (PSM) of said MPEG-2 stream indicating the POC parameter is coded as a temporal POC parameter; and
if said MPEG-2 stream contains said temporal POC parameter, employing said computing device to use said temporal POC parameter to compute a presentation time for said next access unit.

2. The method of claim 1, wherein said MPEG-2 stream is a transport stream.

3. The method of claim 1, wherein if said MPEG-2 stream does not contain said temporal POC parameter the method comprises employing said computing device to compute a presentation time stamp for said next access unit from the presentation time stamp of said initial access unit and an output duration.

4. The method of claim 1, wherein:
said MPEG-2 stream is a program stream; and
the signaling, indicating the POC parameter is coded as a temporal POC parameter, is contained in a PSM.

5. The method of claim 1, further comprising:
computing a number of field repeats, $R_{fld}$, from said temporal POC parameter between said initial access unit (n) and said next access unit (m), when said temporal POC parameter is contained in said MPEG-2 stream.

6. The method of claim 1, further comprising:
computing a number of frame repeats, $R_{frm}$, from said temporal POC parameter between said initial access unit (n) and said next access unit (m), if said temporal POC parameter is contained in said MPEG-2 stream.

7. The method of claim 1, further comprising:
determining whether a decoded picture buffer (DPB) has space; and
computing a decoding time stamp (dts) for a next decoding unit based upon whether there is space in said DPB.

8. A non-transitory computer-readable medium having stored thereon a plurality of instructions which, when executed by a processor, cause the processor to perform the steps of a method for determining timing information from a Moving Pictures Experts Group-2 (MPEG-2) stream carrying Advanced Video Coding (AVC) content, comprising of:
receiving an initial access unit and a next access unit from said MPEG-2 stream, wherein said initial access unit includes a presentation time stamp and said next access unit does not include a presentation time stamp;
determining whether said MPEG-2 stream contains a temporal picture order count (POC) parameter in the video and whether said MPEG-2 stream contains signaling in the Program Map Table (PMT) or a Program Stream Map (PSM) of said MPEG-2 stream indicating the POC parameter is coded as a temporal POC parameter; and
if said MPEG-2 stream contains said temporal POC parameter, using said temporal POC parameter to compute a presentation time for said next access unit.

9. The computer-readable medium of claim 8, wherein said MPEG-2 stream is a transport stream.

10. The computer-readable medium of claim 8, wherein if said MPEG-2 stream does not contain said temporal POC parameter the method comprises computing a presentation time stamp for said next access unit from the presentation time stamp of said initial access unit and an output duration.

11. The computer-readable medium of claim 8, wherein said MPEG-2 stream is a program stream and the signaling indicating the POC parameter is coded as a temporal POC parameter is contained in a PSM.

12. The computer-readable medium of claim 8, further comprising:
computing a number of field repeats, $R_{fld}$, from said temporal POC parameter between said initial access unit (n) and said next access unit (m), when said temporal POC parameter is contained in said MPEG-2 stream.

13. The computer-readable medium of claim 8, further comprising:
computing a number of frame repeats, $R_{frm}$, from said temporal POC parameter between said initial access unit (n) and said next access unit (m), if said temporal POC parameter is contained in said MPEG-2 stream.

14. The computer-readable medium of claim 8, further comprising:
determining whether a decoded picture buffer (DPB) has space; and
computing a decoding time stamp (dts) for a next decoding unit based upon whether there is space in said DPB.

15. An apparatus for determining timing information from a Moving Pictures Experts Group-2 (MPEG-2) stream carrying Advanced Video Coding (AVC) content, comprising:
means for receiving an initial access unit and a next access unit from said MPEG-2 stream, wherein said initial access unit includes a presentation time stamp and said next access unit does not include a presentation time stamp;
means for determining whether said MPEG-2 stream contains a temporal picture order count (POC) parameter in the video and whether said MPEG-2 stream contains signaling in a Program Map Table (PMT) or a Program Stream Map (PSM) of said MPEG-2 stream indicating the POC parameter is coded as a temporal POC parameter; and
means for using said temporal POC parameter to compute a presentation time for said next access unit if said MPEG-2 stream contains said temporal POC parameter.

16. The apparatus of claim 15, wherein said MPEG-2 stream is a transport stream.

17. The apparatus of claim 15, wherein if said MPEG-2 stream does not contain said temporal POC parameter the method comprises computing a presentation time stamp for said next access unit from the presentation time stamp of said initial access unit and an output duration.

18. The apparatus of claim 15, wherein said MPEG-2 stream is a program stream and the signaling indicating the POC parameter is coded as a temporal POC parameter is contained in a PSM.

19. The apparatus of claim 15, further comprising:
means for computing a number of field repeats, $R_{fld}$, or a number of frame repeats, Rfrm, from said temporal POC parameter between said initial access unit (n) and said next access unit (m), if said temporal POC parameter is contained in said MPEG-2 stream.

20. A method for determining timing information from a Moving Pictures Experts Group-2 (MPEG-2) stream carrying Advanced Video Coding (AVC) content, comprising:
receiving an initial access unit from said MPEG-2 stream at a computing device, wherein said initial access unit includes a decoding time stamp;
determining whether a decoded picture buffer (DPB) has space; and
if said DPB has space, employing said computing device to compute a decoding time for a next access unit as equal to a sum of the decoding time of said initial access unit and plus in integer multiple of a field period,
else employing said computing device to compute an initial decoding time for said next access unit as greater than said sum and compute an adjusted decoding time for said next access unit.

* * * * *